(12) United States Patent
Evans et al.

(10) Patent No.: US 11,343,207 B1
(45) Date of Patent: May 24, 2022

(54) CONFIGURING OF A SHARED MEMORY BUFFER IN A NETWORK DEVICE

(71) Applicant: Amazon Technologies, Inc., Seattle, WA (US)

(72) Inventors: John William Evans, Frome (GB); Seyed Arash Sadrieh, Horsley (AU); Alber Edmon Abdelshahid Moines, Dublin (IE); Colin John Whittaker, Dublin (IE)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/871,817

(22) Filed: May 11, 2020

(51) Int. Cl.
*H04L 49/90* (2022.01)
*H04L 47/50* (2022.01)
*H04L 41/14* (2022.01)
*H04L 47/32* (2022.01)
*H04L 41/0816* (2022.01)
*H04L 47/30* (2022.01)

(52) U.S. Cl.
CPC .......... *H04L 49/90* (2013.01); *H04L 41/0816* (2013.01); *H04L 41/145* (2013.01); *H04L 47/30* (2013.01); *H04L 47/32* (2013.01); *H04L 47/50* (2013.01)

(58) Field of Classification Search
None
See application file for complete search history.

(56) References Cited

U.S. PATENT DOCUMENTS

| 10,476,910 | B2 * | 11/2019 | Spillman | H04L 63/20 |
| 2010/0061376 | A1 * | 3/2010 | Shimizu | H04L 49/103 370/395.7 |
| 2016/0344636 | A1 * | 11/2016 | Elias | H04L 47/2441 |
| 2019/0386913 | A1 * | 12/2019 | Wei | H04L 49/1515 |

* cited by examiner

*Primary Examiner* — Otis L Thompson, Jr.
(74) *Attorney, Agent, or Firm* — Klarquist Sparkman, LLP

(57) ABSTRACT

An optimization agent optimizes configuration parameters of a shared memory buffer for ports of a network device (e.g., router). The optimization agent located on the network device (or remotely) takes an input state from the network device's switching logic, such as the packets transmitted or dropped per port, and determines port buffer settings to optimize the settings to achieve a goal. The buffer settings can include minimum and maximum buffer limits per port and the goal can be to maximize port utilization or minimize port loss. The optimization agent can then take an action by applying the buffer configurations to the switching logic and repeat the process iteratively until the goal is reached.

20 Claims, 6 Drawing Sheets

US 11,343,207 B1

CONFIGURING OF A SHARED MEMORY BUFFER IN A NETWORK DEVICE

BACKGROUND

Traffic on the Internet has quickly grown and continues to expand at unprecedented rates. Network switches play a critical role in sustaining that growth. Data to be passed by switches is generally divided into a series of packets that can be transmitted between devices. Packets include control information and payload data. The control information includes information used to deliver the payload data. For example, control information can include source and destination network addresses, error detection codes, packet sequencing identification, and the like.

The network switches (e.g., routers) can include custom Application Specific Integrated Circuits (ASICs) or generic ASICS that are designed to switch network traffic. Typically, generic ASICS have a limited pool of buffer memory, which is shared between ports. The buffer memory can be partitioned between the ports by defining thresholds for an amount of memory that may be consumed by packets associated with specific input/ingress ports and output/egress ports. The limited buffer size means that if the buffer allocation between ports is ineffective, the buffers are less able to absorb bursts of traffic, which results in packets being dropped at relatively low levels of utilization causing ineffective use of link capacity. Packet loss is a key metric for network service performance and effective buffer allocation is important to minimizing packet loss and ensuring that link capacity can be effectively used.

DETAILED DESCRIPTION

Buffer allocation in a network switch is based upon static configuration of thresholds and weightings that are configured for each port. To be effective, the buffer allocation should be retuned depending upon where in the network the network switch is deployed, upon which interfaces are used, and upon analyzing a traffic profile. Additionally, the buffer allocation can change during the lifecycle of the router. In practice, it takes weeks or months to manually tune buffers for a specific network switch's scenario and then deploy that configuration to the network. Further, the possible number of parameter combinations is large, making manual tuning impractical. Accordingly, an optimization agent can be located on the network switch (or remotely) that takes an input state from the switch's ASIC, such as the packets transmitted or dropped per port, and determines port buffer settings to optimize the settings to achieve a goal. The buffer settings can include minimum and maximum buffer limits per port and the goal can be to maximize port utilization or minimize packet loss or minimize latency. The optimization agent can then take an action by applying the buffer configurations to the ASIC and repeat the process iteratively until the goal is reached.

One benefit of using the optimization agent is that readily-available commercial ASICs can be used (as opposed to a customized ASIC), and packet loss can be minimized despite having a limited buffer area in the selected ASIC.

Figure 1:
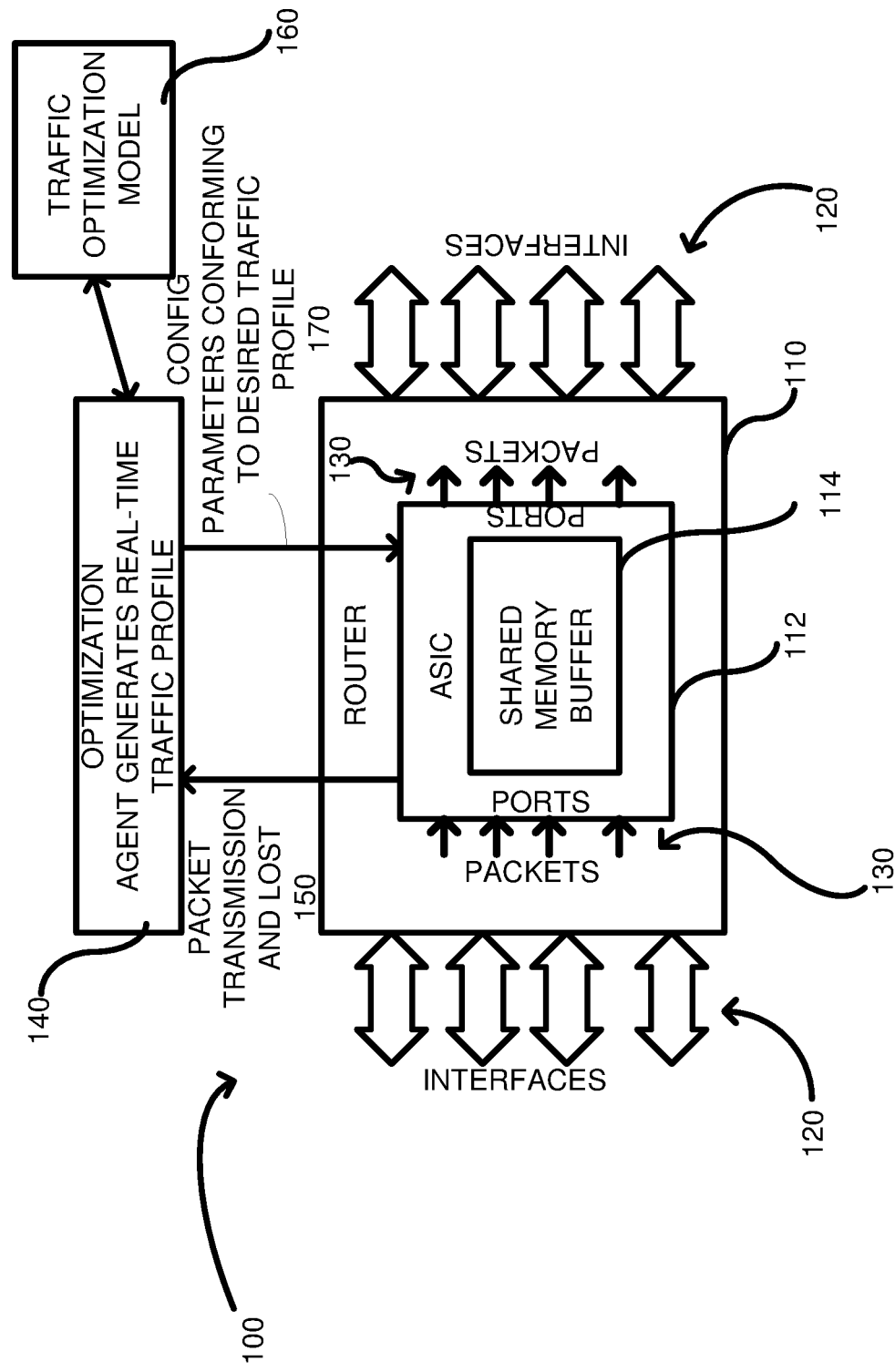
FIG. 1 is an example system for configuring a shared memory buffer in a router.

FIG. 1 is an example system 100 that includes a router 110 with a shared memory buffer architecture including an ASIC 112 for switching packets and a shared memory buffer 114. The router 110 includes interfaces 120 for coupling via cables to other neighbor routers (not shown). The interfaces 120 are coupled to ports 130, which can be in a one-to-one correspondence or there can be multiple ports 130 sharing interfaces 120. Generally, network packets are received on the interfaces 120, pass through the ASIC 112, and are switched to other interfaces 120 to move the packets through a network. The ASIC 112 is further described below in FIG. 2. An optimization agent 140 can be executed on the router 110 or external to the router and receives real-time packet data from the ASIC 112, such as packets and bytes transmitted and dropped per port, such as is shown generically at 150. Using the real-time packet data 150, the optimization agent 140 can generate a model on a per-port basis. More specifically, the agent can have a function that mathematically models a relationship between port utilization (U), port loss (L), and port buffer settings. This model can be derived from analyzing past data, such as by using regression or by actively learning through trying different port buffer settings and measuring the result (e.g., using reinforced learning). The optimization agent 140 can then use the traffic optimization model, stored in a database 160, to generate shared memory buffer configurations that can be used by the optimization agent 140 and applied to the ASIC 112, as shown at 170. The shared memory buffer configurations 170 can include minimum and maximum buffer limits per port. Other configuration parameters can also be applied and stored in the ASIC 112. Thus, a real-time traffic profile can be generated using the packet data 150 (including packets lost), used to supplement the traffic optimization model and generate new configuration parameters for modifying the shared memory buffer allocation per port. The traffic optimization model 160 can also be generated using simulations of past data of routers in the network. Additionally, traffic profiles can be classified to minimize a number of steps needed to iterate towards an optimal setting of the configuration parameters. The configuration parameters can be modified at predetermined periods of time, such as 1 hour, 24 hours, etc. The configuration parameters can also take into account a type of router, such as routers having different numbers of memory management units. An ideal goal can be, for example, to minimize packet loss, minimize loss rate, or minimize loss rate during a time period.

Figure 2:
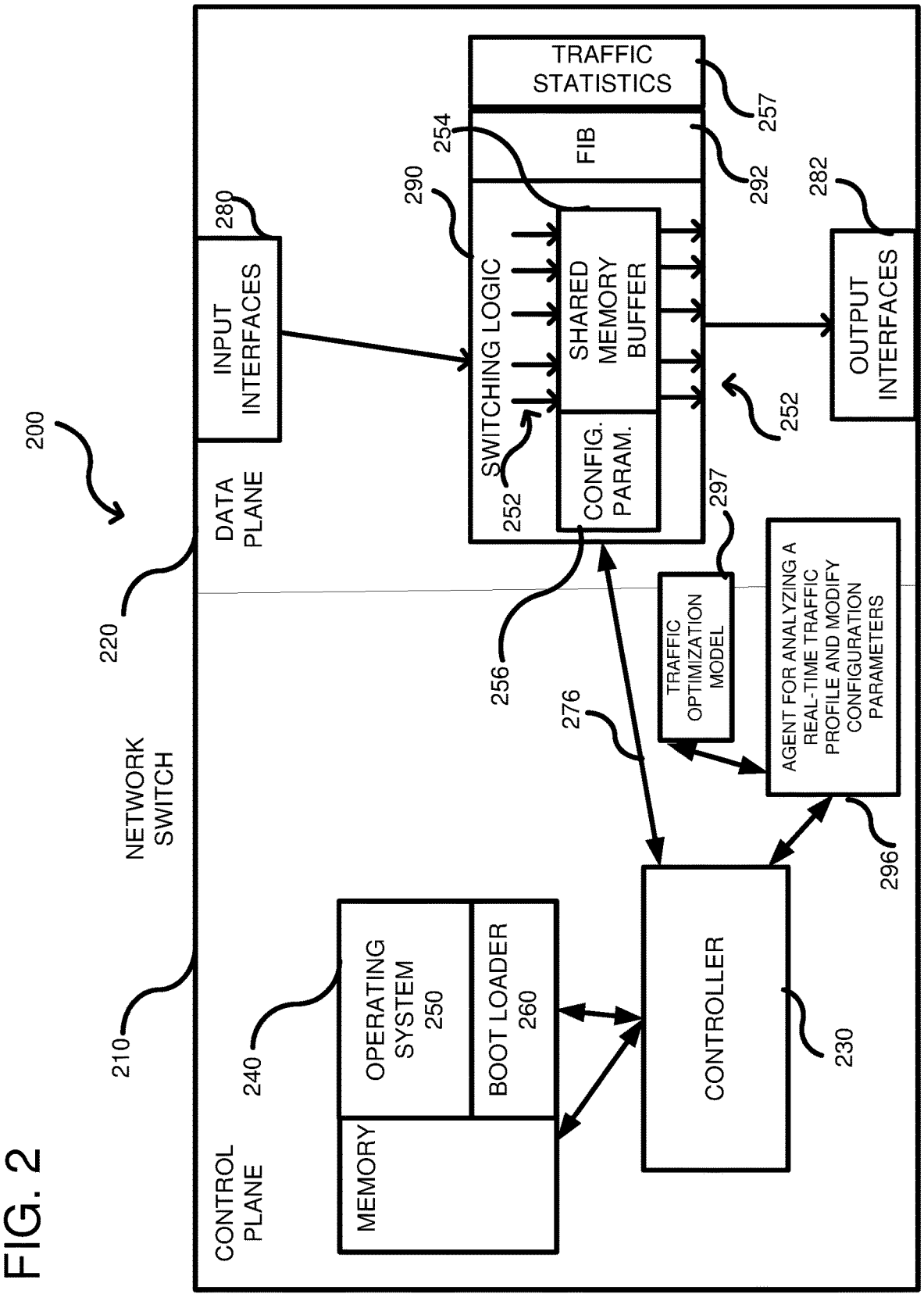
FIG. 2 is an example of a network switch including configuration parameters modified by a local agent based on a real-time traffic profile of switching logic.

FIG. 2 shows further details of an embodiment of a network device 200 that is used for forwarding packets to neighbor network devices. The network device 200 can be any of a variety of switches (multilayer or single-layer), routers, repeaters, gateways, network bridges, hubs, protocol converters, bridge routers, proxy servers, firewalls, network address translators, network interface controllers, wireless network interface controllers, and wireless access points, for example. Thus, a network device can include any device used for forwarding packet data through a network. The network device 200 includes a control plane 210 and a data plane 220. The control plane 210 is generally a management layer for configuring, updating, and controlling the data plane 220. The control plane includes a controller 230, which can be a Central Processing Unit (CPU), processor, ASIC, microcontroller, or any hardware logic that can receive packets and provide switch management and control in response thereto. The controller 230 has access to a memory 240 that can be a Dynamic Random Access Memory (DRAM), Flash memory, or other type of RAM or ROM. The memory 240 is used to store an operating system 250 for the network device 200. The memory 240 may also include a boot loader program 260, which is a first program executed after a reboot of the controller 230, and which can run basic hardware tests before booting up the operating system 250. Although a single memory is shown, the memory 240 can be divided into multiple memories and even memories of different types. A communications bus 276 allows communications between the controller 230 and the data plane 220. The communications bus 276 can be any desired bus type, such as PCI, PCIe, AGP, etc. The data plane 220 includes input interfaces 280 and output interfaces 282 used for receiving and sending network packets, respectively, from neighbor network devices. Switching logic 290 is positioned intermediate the input and output interfaces. A forwarding information base (FIB) 292 is a forwarding table that can be programmed by the control plane 210 and describes next hops for identified prefixes. Thus, routing information in terms of a next hop for a prefix is made by the switching logic 290 using the FIB.

After a reboot of the control plane 210, and, in particular, a reboot of the controller 230, the controller executes the boot loader 260 by retrieving it from the memory 240. Using the boot loader 260, the controller 230 can establish communications over the bus 276 so that the hardware bus becomes operational. Once operational, the switching logic 290 can begin transmitting packets from the input interface 280 to the output interface 282. An agent 296 can execute on the control plane 210 (the agent 296 can be a software application executing on the controller). The agent 296 can receive real-time traffic profile information from the data plane 220 over the bus 276, such as a number of packets transmitted and a number of packets lost in a given time window.

Although not shown, the switching logic 290 can include an ASIC. Within the ASIC, the switching logic 290 can include multiple different hardware logic blocks including a Layer 2 hardware block, a Layer 3 hardware block, and an ACL hardware block. The layer 2 hardware block relates to an Ethernet layer and can forward packets based on MAC tables. The layer 3 hardware block relates to forwarding based on a prefix match of an IP address. The ACL block relates to permissions and can include rules whether to drop packets. The different hardware blocks can be coupled in series and additional hardware blocks can be added based on the design. Packets pass from the input interface 280 to the output interface 282 in accordance with the configuration of the layers 2 and 3 hardware logic blocks. Although only a single input and output interface are shown, typically the ASIC controls multiple interfaces used for forwarding traffic to next hops. Also, included in the switching logic 290 is traffic statistics logic 257 for capturing a total number of packets transmitted and packets lost. The traffic statistics logic 257 can include simple counters related to the packets transmitted and packets lost due to overflow of the shared memory buffer 254.

The switching logic 290 further includes a number of ingress and egress ports 252. The ingress/egress ports 252 can share a memory buffer 254 to minimize packet loss. The memory buffer 254 is partitioned between different ports based on the configuration parameters 256. Thus, each port is allocated a portion of the memory buffer. A plurality of configuration parameters 256 are associated with the shared memory buffer 254 to control a minimum allocation per port, a maximum allocation per port, and potentially other configuration parameters describing how the memory 254 is shared amongst the ports 252. The agent 296 can update the configuration parameters 256 to modify the partitioning of the shared memory buffer 254. For example, the agent 296 can receive real-time traffic profile data from the switching logic 290 that was captured by the traffic statistics logic 257. The agent 296 can then use the received traffic profile data with a traffic optimization model in a database 297 to determine configuration parameters. The agent 296 can then use the configuration parameters obtained from the model in the database 297 to update the configuration parameters 256 in the switching logic 290. In addition, the agent 296 can used the received traffic profile data to update the traffic optimization model 297 and refine the model. The agent 296 can iteratively repeat the model generation and modification of the configuration parameters at periodic intervals (fixed time intervals) to move the partitioning of the shared memory buffer 254 towards a goal, such as to minimize packet loss or minimize the packet loss rate.

Figure 3:
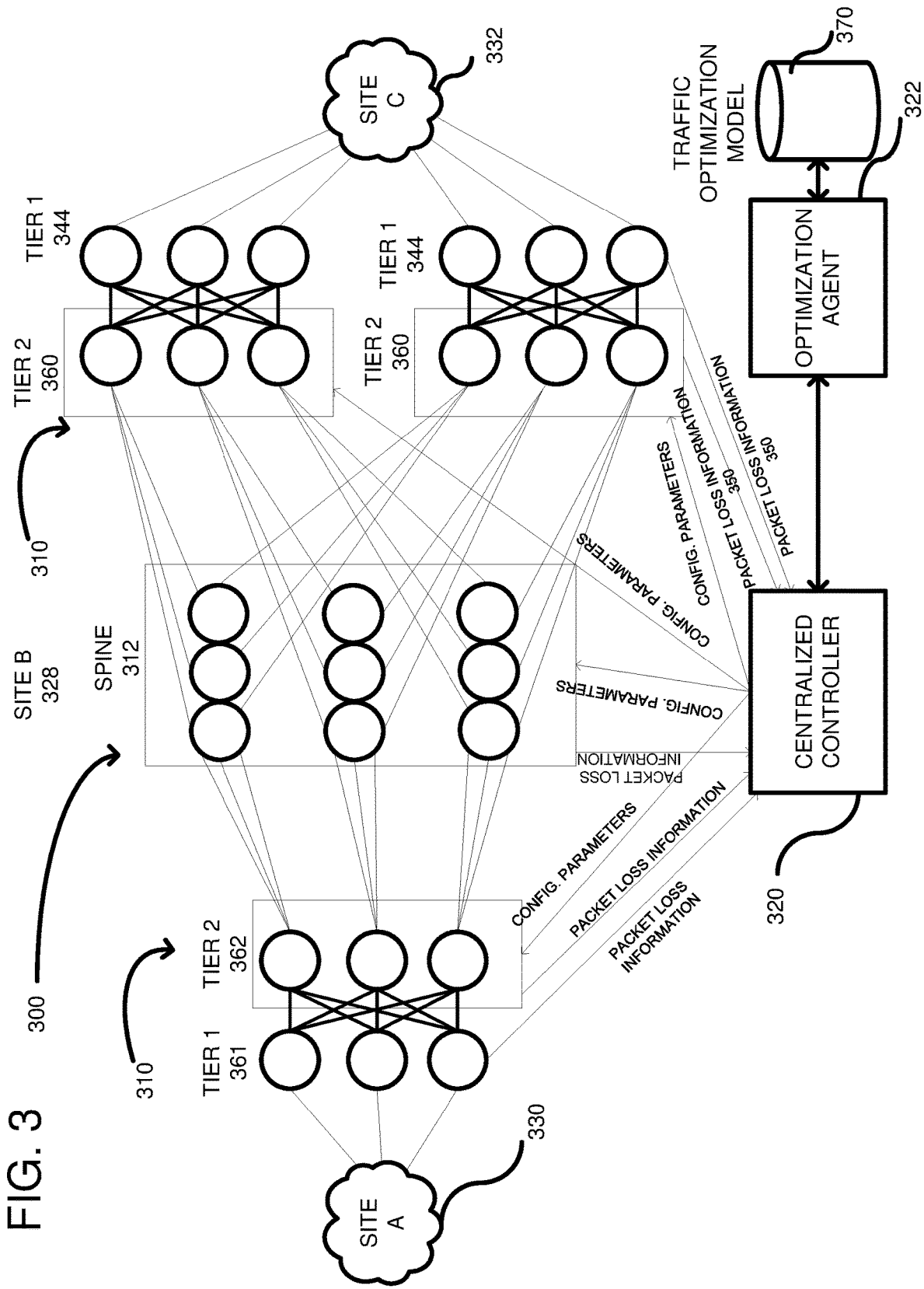
FIG. 3 is an example of a system including a centralized optimization agent used to modify shared memory buffers in multiple network devices in a tiered network structure.

FIG. 3 is another example embodiment including a hierarchical network 300 having multiple layers including tiers 310 and a spine layer 312. A variety of network structures can be used, such as a spine-leaf network topology or network structures having an intermediate aggregation layer. Other network topologies include Clos-type networks (two-tier Clos, three-tier Clos, etc.) In this embodiment, a centralized controller 320 executes on a server computer and is a distribution mechanism for transmitting configuration parameters for shared memory buffers to the tiers 310 and spine layer 312, while an optimization agent 322 is used to generate an optimization strategy for shared memory buffers of the network devices in the tiers. It should be recognized that the centralized controller described in all embodiments herein can be a distributed computing environment having multiple server computers. In this embodiment, the hierarchical network 300 is shown as a site B 328 coupled to other networks labeled site A at 330 and site C at 332. Profile information, such as packet loss information, of tier 1 344 is passed back to the centralized controller 320 as shown at 350. Although only a single arrow 350 is shown, it is understood that all switches in the tier 1 344 are transmitting profile information to the centralized controller 320 so that the centralized controller can obtain a view of each switch's traffic profile. Traffic profile information can also be received for the other tiers 360, 361 and 362 as indicated by the arrows labeled packet loss information from each tier. Thus, the traffic profile information can be a representation of how network traffic changes over a time interval. Receiving individual traffic profile information for the network devices allows the centralized controller 320 and the optimization agent 322 to obtain a more global view of the traffic profiles across the network devices. This traffic profile information can be passed from the centralized controller 320 to the optimization agent 322 (which is an application executing on a server computer) for generation of an optimization plan for each switch (shown as circles in the tiers) in the network. Using a generalized optimization plan, the optimization agent 322 can generate the configuration parameters for the shared memory buffers and pass it to the centralized controller 320 for distribution. In turn, the centralized controller 320 can transmit the configuration information to each of the higher level tiers in the network including tier 2 at 360, 362 and the spine 312.

In particular, the optimization agent 322 can analyze the received traffic profile information from the tiers and use the traffic profile information or traffic loss information in a stored traffic optimization model 370 that can be used to generate configuration parameters. The stored model 370 can be used to generate configuration parameters for the shared memory buffers of the network devices in the tiers to control the memory buffers on a per-port basis. Using the stored traffic model 370, the optimization agent 322 can make decisions about the optimal configuration settings for the shared memory buffer for each router port.

Figure 4:
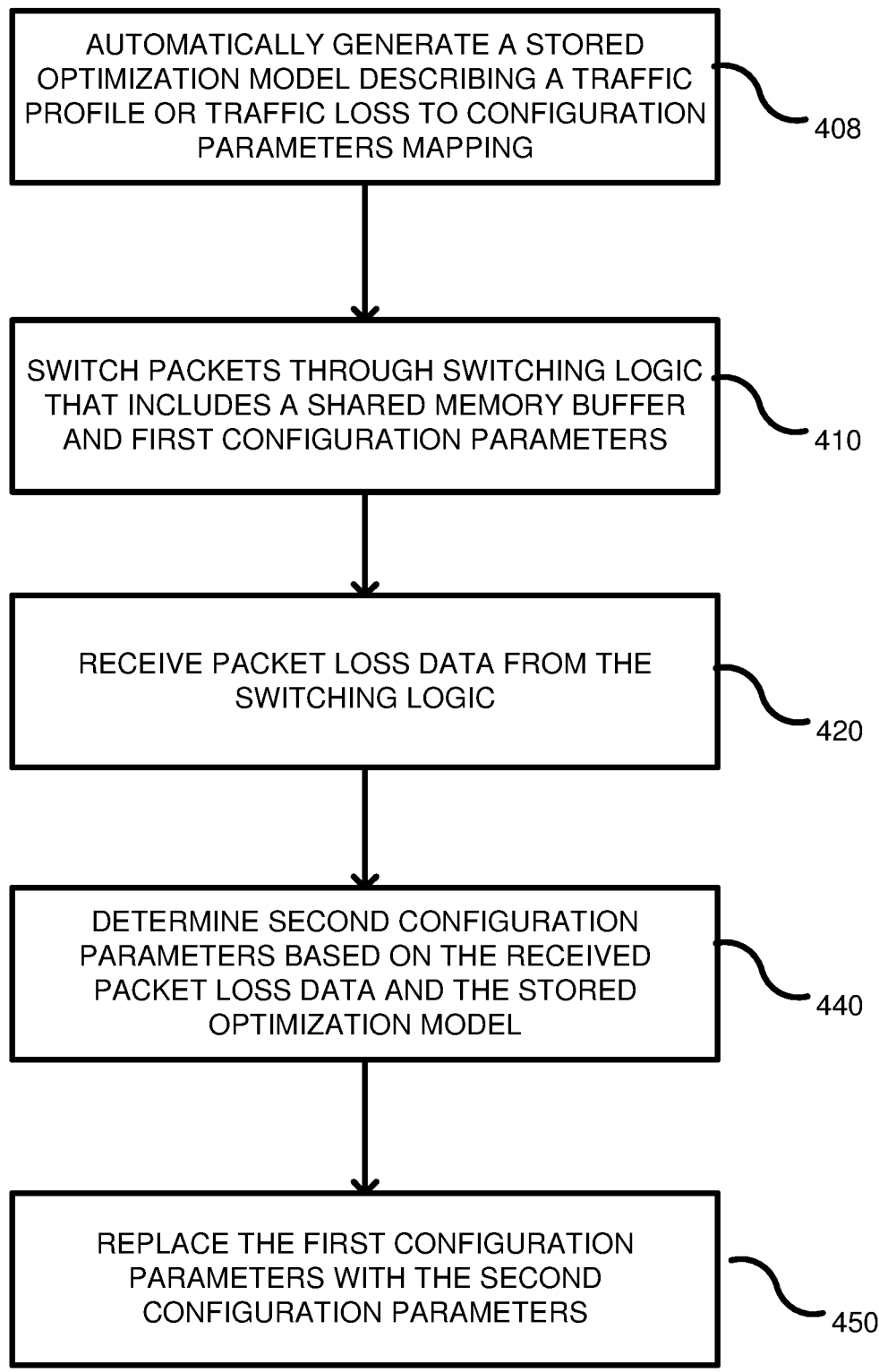
FIG. 4 is a flowchart of a method according to one embodiment for modifying configuration parameters in a shared memory buffer.

FIG. 4 is a flowchart according to one embodiment for automatically optimizing shared memory buffers in network devices. In process block 408, an optimization agent can automatically generate a stored optimization model describing a traffic profile or traffic loss to configuration parameters mapping. For example, in FIG. 2, the agent 296 can generate a function that mathematically models a relationship between port utilization, port loss, and port buffer settings (e.g., the configuration parameters). This model can be derived from analyzing past data, such as by using regression or by actively learning through trying different buffer settings and measuring the result. The generation of the model can be done at periodic intervals and automatically at each interval. In process block 410, packets are switched through switching logic that includes a shared memory buffer having first configuration parameters. For example, in FIG. 2, the switching logic 290 has a shared memory buffer 254 and associated configuration parameters 256. In process block 420, packet loss data is received from the switching logic. For example, in FIG. 2, traffic profile logic 257 can obtain packet loss data and transmit the packet loss data to the agent 296, which receives the data for analysis. Alternatively, or, in addition, traffic profile information can be transmitted to the agent from a remote server. In process block 440, second configuration parameters can be determined using the packet loss data and the stored optimization model. The agent can obtain the configuration parameters from the database that will move the network device towards an optimization goal. The optimization goal can be to maximize port utilization or minimize packet loss, wherein the goal can be controlled by a network administrator, which sets the goal and stores configuration parameters in the database to meet the goal. The agent can adapt the obtained configuration parameters to the particular network device based on the type of network device or the hardware available on the network device. Thus, for example, the agent can adapt the configuration parameters based upon how many memory management units are in the network device. In one example, the stored optimization model can be a function with the packet loss data as an input parameter. The agent can then automatically compute a result of the function to determine the configuration parameters. In process block 450, the agent can replace the first configuration parameters with the second configuration parameters. For example, in FIG. 2, the agent 296 can execute on the controller 230 and communicate with the switching logic 290 through the bus 276 to update the configuration parameters 256 of the shared memory buffer 254.

Figure 5:
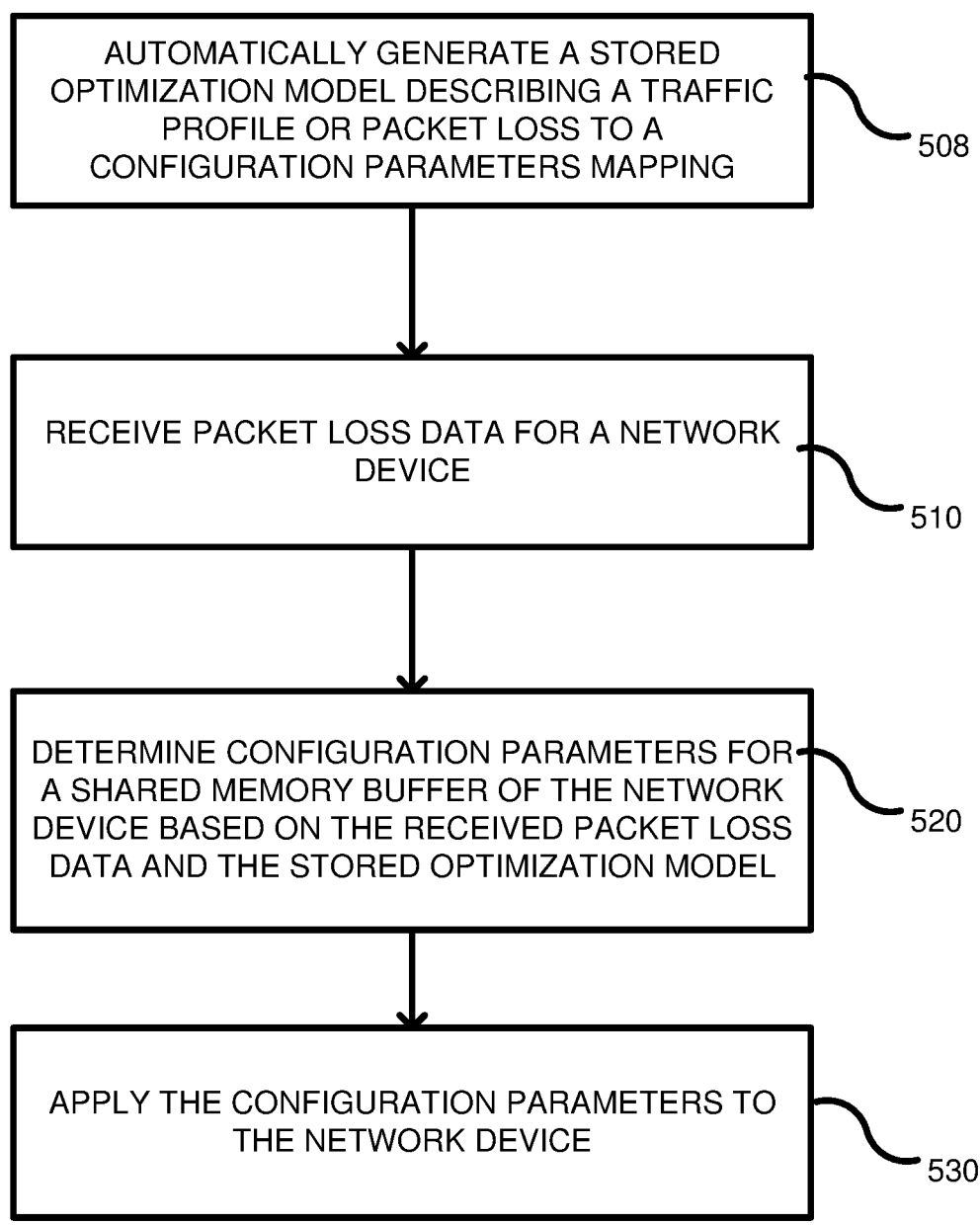
FIG. 5 is a flowchart of a method according to another embodiment for modifying configuration parameters in a shared memory buffer.

FIG. 5 is another embodiment of a method for configuring a memory buffer in a network device. In process block 508, an optimization model can be automatically generated and stored for future use. The optimization model can be a function describing a traffic profile or packet loss and a mapping of the traffic profile or packet loss to configuration parameters. In process block 510, packet loss data is received for a network device. For example, in FIG. 1, packet transmission and packet lost data 150 can be received in an optimization agent 140. Similarly, in FIG. 2, the agent 296 receives the packet loss data and potentially other data for generating a traffic profile. In FIG. 3, the optimization agent 322 receives the packet loss data from multiple network devices in parallel, and the data can be for each individual port on each network device. In some embodiments, the agent can use the received packet loss data to generate a real-time traffic profile. For example, in FIG. 1, the agent 140 can generate the traffic optimization model 160 and can generate a real-time traffic profile based on data 150. In process block 520, configuration parameters are determined by the optimization agent for the shared memory buffer. The determination can include using the received packet loss data (and potentially total transmission data) to generate a real-time traffic profile. The real-time traffic profile can then be used with the optimization model to determine the configuration parameters needed to move the stored memory buffer towards an optimized state. The updated configuration parameters will change the allocation of the shared memory buffer. In process block 530, the determined configuration parameters can be applied to the network device. For example, in FIG. 2, the agent 296 can update the configuration parameters 256, which may require the controller 230 to temporarily suspend packet switching in the data plane 220.

Figure 6:
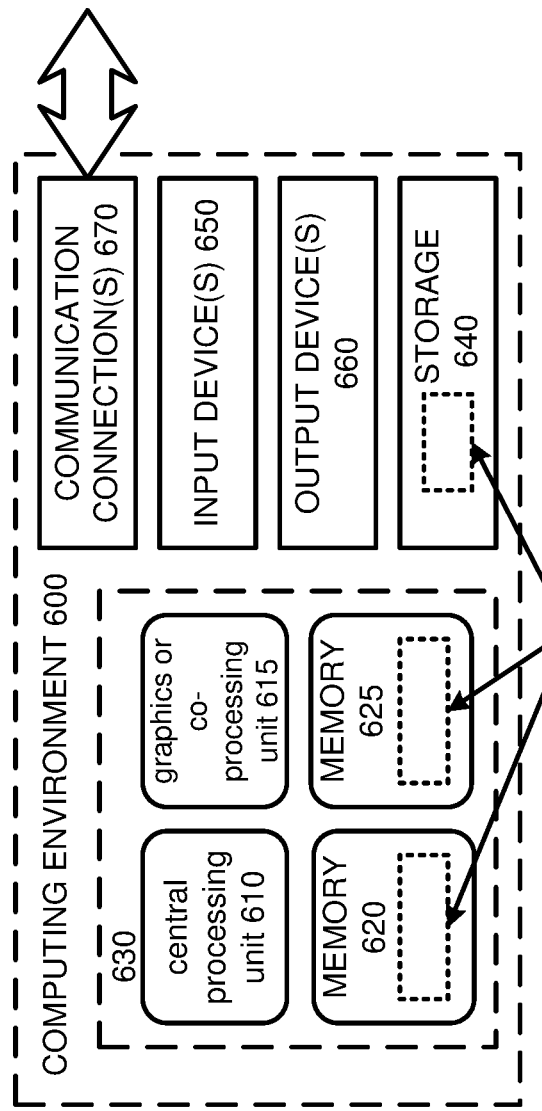
FIG. 6 depicts a generalized example of a suitable computing environment in which the described innovations may be implemented.

FIG. 6 depicts a generalized example of a suitable computing environment 600 in which the described innovations may be implemented. The computing environment 600 is not intended to suggest any limitation as to scope of use or functionality, as the innovations may be implemented in diverse general-purpose or special-purpose computing systems. For example, the computing environment 600 can be any of a variety of computing devices (e.g., desktop computer, laptop computer, server computer, tablet computer, etc.) and can be used for executing the optimization agent. Various components of the computing device can also be used in the network devices.

With reference to FIG. 6, the computing environment 600 includes one or more processing units 610, 615 and memory 620, 625. In FIG. 6, this basic configuration 630 is included within a dashed line. The processing units 610, 615 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 6 shows a central processing unit 610 as well as a graphics processing unit or co-processing unit 615. The tangible memory 620, 625 may be volatile memory (e.g., registers, cache, RAM), non-volatile memory (e.g., ROM, EEPROM, flash memory, etc.), or some combination of the two, accessible by the processing unit(s). The memory 620, 625 stores software 680 implementing one or more innovations described herein, in the form of computer-executable instructions suitable for execution by the processing unit(s).

A computing system may have additional features. For example, the computing environment 600 includes storage 640, one or more input devices 650, one or more output devices 660, and one or more communication connections 670. An interconnection mechanism (not shown) such as a bus, controller, or network interconnects the components of the computing environment 600. Typically, operating system software (not shown) provides an operating environment for other software executing in the computing environment 600, and coordinates activities of the components of the computing environment 600.

The tangible storage 640 may be removable or non-removable, and includes magnetic disks, magnetic tapes or cassettes, CD-ROMs, DVDs, or any other medium which can be used to store information in a non-transitory way and which can be accessed within the computing environment 600. The storage 640 stores instructions for the software 680 implementing one or more innovations described herein.

The input device(s) 650 may be a touch input device such as a keyboard, mouse, pen, or trackball, a voice input device, a scanning device, or another device that provides input to the computing environment 600. The output device(s) 660 may be a display, printer, speaker, CD-writer, or another device that provides output from the computing environment 600.

The communication connection(s) 670 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., one or more optical media discs, volatile memory components (such as DRAM or SRAM), or non-volatile memory components (such as flash memory or hard drives)) and executed on a computer (e.g., any commercially available computer, including smart phones or other mobile devices that include computing hardware). The term computer-readable storage media does not include communication connections, such as signals and carrier waves. Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, aspects of the disclosed technology can be implemented by software written in C++, Java, Perl, any other suitable programming language. Likewise, the disclosed technology is not limited to any particular computer or type of hardware. Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved.

In view of the many possible embodiments to which the principles of the disclosed invention may be applied, it should be recognized that the illustrated embodiments are only examples of the invention and should not be taken as limiting the scope of the invention. We therefore claim as our invention all that comes within the scope of these claims.

What is claimed is:

1. A method of configuring a memory buffer in a network device, comprising:
   (a) automatically generating a stored optimization model describing a traffic profile or packet-loss-to-configuration-parameters mapping;
   (b) switching packets through switching logic in a network device, wherein the switching logic includes a shared memory buffer for multiple ports and first configuration parameters that allocate the shared memory buffer between the multiple ports;
   (c) receiving packet loss data from the switching logic;
   (d) determining second configuration parameters based on the received packet loss data and the stored optimization model; and (e) replacing the first configuration parameters with the second configuration parameters to modify the allocation of the shared memory buffer between the multiple ports.

2. The method of claim 1, further including iterating over (a) through (e) at fixed time intervals.

3. The method of claim 1, wherein the determining the second configuration parameters is performed by an agent executing on the network device.

4. The method of claim 1, wherein the determining the second configuration parameters includes selecting the second configuration parameters to minimize a packet loss rate.

5. The method of claim 1, wherein the traffic profile is a representation of how packet traffic changes over time.

6. The method of claim 1, wherein each of the multiple ports in the switching logic has an associated traffic profile and the second configuration parameters are determined for each port.

7. A method, comprising:
automatically generating a stored optimization model describing a mapping of a traffic profile or packet-loss-to-configuration parameters;
receiving packet loss data for a network device;
determining configuration parameters for a shared memory buffer of the network device based on the received packet loss data and the stored optimization model in order to reduce packet loss or minimize latency; and
applying the configuration parameters to the network device,
wherein the configuration parameters relate to a minimum buffer allocation per port of the network device and a maximum buffer allocation per port of the network device.

8. The method of claim 7, wherein the receiving packet loss data includes receiving packet loss data, in an optimization agent, from switching logic in the network device.

9. The method of claim 8, wherein the optimization agent is executed in a controller within the network device.

10. The method of claim 7, wherein the determining of the configuration parameters includes determining different configuration parameters for each port on switching logic in the network device.

11. The method of claim 7, wherein the determining of the configuration parameters includes analyzing the traffic profile or packet loss and using the generated model to determine the configuration parameters.

12. The method of claim 11, wherein the determined configuration parameters are associated with minimized packet loss.

13. The method of claim 7, wherein the determining of the configuration parameters and the applying of the configuration parameters is performed at periodic intervals.

14. The method of claim 7, wherein the network device is a router and the determining configuration parameters is performed in a controller within the router.

15. The method of claim 7, wherein the configuration parameters describe how the shared memory buffer is shared amongst multiple ports of the network device.

16. A network device, comprising:
switching logic having a shared memory buffer for multiple ports of the network device, wherein configuration parameters are used for partitioning the shared memory buffer among the multiple ports;
a controller coupled to the switching logic for receiving information from the switching logic regarding packets transmitted and packets dropped by the switching logic; and
an agent for executing on, or being in communication with, the controller for updating the configuration parameters in response to the received information to modify the partitioning of the shared memory buffer among the multiple ports, the agent further for generating a stored optimization model describing a traffic profile or packet-loss-to-configuration parameters.

17. The network device of claim 16, wherein the configuration parameters are set by the agent for each port in the switching logic.

18. The network device of claim 16, wherein the agent is configured to use the received information to generate the configuration parameters using the stored optimization model.

19. The network device of claim 16, wherein the agent is executed on a server computer remote from the network device.

20. The network device of claim 16, wherein the network device is a router.

* * * * *